United States Patent

[11] 3,595,151

[72] Inventors Dieter Maas
Munich;
Richard Schmierl, Unterhaching, both of, Germany
[21] Appl. No. 858,463
[22] Filed Sept. 16, 1969
[45] Patented July 27, 1971
[73] Assignee Agfa-Gevaert Aktiengesellschaft
Leverkusen, Germany
[32] Priority Sept. 21, 1968
[33] Germany
[31] P 17 97 375.0

[54] FILM METERING DEVICE
12 Claims, 3 Drawing Figs.

[52] U.S. Cl. .................................................. 95/31 FM, 95/31 FL
[51] Int. Cl. .................................................. G03b 1/62
[50] Field of Search .......................................... 95/31 FM; 242/71, 71.3

[56] References Cited
UNITED STATES PATENTS

| 2,559,892 | 7/1951 | Mihalyi et al. | 95/31 (FM) |
| 3,416,425 | 12/1968 | Rigolini | 95/31 (FM) |
| 3,148,605 | 9/1964 | Peterson et al. | 95/31 (FM) |
| 3,416,424 | 12/1968 | Harvey | 95/31 (FM) |
| 3,232,196 | 2/1966 | Sapp, Jr. et al. | 95/31 (FM) |
| 3,406,621 | 10/1968 | Irwin | 95/31 (FM) |

Primary Examiner—Samuel S. Matthews
Assistant Examiner—Russell E. Adams, Jr.
Attorney—Michael S. Striker ABSTRACT: A film metering device in a camera for use with film having a perforation for each film frame consists of a toothed film transporting wheel which can be held against rotation by a rigid pawl forming part of a control lever which is biased from a starting position through an intermediate position and to an operative position in which the pawl engages the wheel. The lever has a springy arm which tracks the film and enters an oncoming perforation to permit movement of the lever to its intermediate position. The arm is deformed in response to further transport of the film and permits movement of the lever to its operative position upon completed transport of the film by the length of a frame. A follower element forming part of the springy arm engages a cam element formed on the camera having to lock the arm in its tensed operative position. The shutter release serves to unlock the springy arm and to return the lever and arm to their starting position.

INVENTOR.
DIETER MAAS
RICHARD SCHMIERL

BY

FILM METERING DEVICE

BACKGROUND OF THE INVENTION

The present invention relates to photographic apparatus in general, and more particularly to improvement in photographic apparatus for use with film of the type having a row of perforation, one for each film frame. Still more particularly, the invention relates to improvements in photographic apparatus which are provided with means for preventing repeated film transport between successive exposures.

SUMMARY OF THE INVENTION

An object of the invention is to provide a simple, compact and inexpensive camera for use with roll film of the type having a perforation for each film frame and to construct and assemble the camera in such a way that a single control member suffices to automatically terminate the transport of film when the film is advanced by the length of a frame following the completion of an exposure and wherein such single control member also serves to prevent repeated transport of film between successive exposures.

Another object of the invention is to provide a novel and improved control member which can be used in the above outlined photographic apparatus.

The photographic apparatus of our invention is used with roll film of the type having a row of perforations, one for each film frame, and comprises film transporting means operative to advance the film along a predetermined path, a housing supporting the film transporting means and defining the aforementioned path, and a control member which is movable in the housing between starting and operative positions and through an intermediate position and permanently tends to assume its operative position. The control member comprises a preferably rigid first portion which is arranged to prevent operation of the film transporting means in operative position of the control member and a springy second portion which is adjacent to the path for the film and tends to enter an oncoming perforation during transport of the film to thereby permit movement of the control member from its starting to its intermediate position. The second portion undergoes deformation in response to further transport of the film to thus permit movement of the control member to its operative position upon completed transport of the film by the length of a frame.

The second portion of the control member preferably comprises a follower element which tracks a cam element of the housing in the intermediate position of the control member. One of these elements is provided with a recess, notch or a like opening which receives the other element in operative position of the control member. The control member is preferably a lever which is pivotable between its operative and starting positions and is moved back to starting position in response to actuation of the shutter release.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
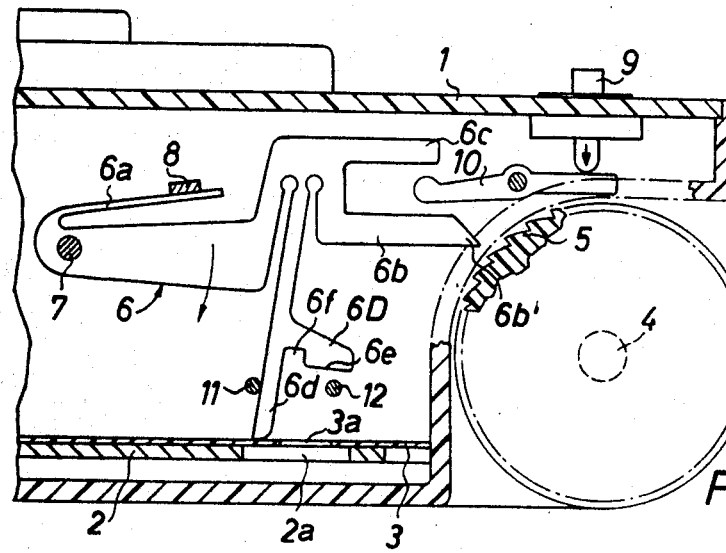
FIG. 1 is a fragmentary horizontal sectional view of a still camera which embodies one form of the invention.

Referring first to FIG. 1, there is shown a portion of a still camera having a housing 1 provided in its interior with a film guide or platform 2 having a cutout or opening 2a. The front (upper) surface of the platform 2 guides the roll film 3 which is provided with a row of equidistant perforations 3a, one for each film frame. The perforations 3a travel along a straight path in front of the opening 2a when the film 3 is being transported by a mechanism including a shaft 4 which is rotatably mounted in the housing 1 and can be rotated by a toothed wheel 5. The shaft 4 forms part of or is connected with a takeup reel or spool which collects exposed film.

In accordance with a feature of the invention, the means for preventing repeated transport of film between successive exposures and for insuring the film is transported only by the length of a frame in response to each manipulation of the wheel 5 comprises a one-piece control member 6 which is a lever fulcrumed at 7 and having an elastically deformable integral springy arm 6a which bears against a fixed retainer 8 in the housing 1. The arm 6a tends to turn the control lever 6 in a clockwise direction, as viewed in FIG. 1. The lever 6 further comprises two rigid arms 6b, 6c; the arm 6b can be moved into engagement with the teeth of the film transporting wheel 5 and thus constitutes a pawl which can prevent further transport of film 3 as soon as it engages the wheel 5. The arm 6c serves to return the control lever 6 to the starting position shown in FIG. 1 and can be pivoted in a counterclockwise direction by a two-armed lever 10 which is pivoted clockwise in response to depression of a shutter release knob 9 mounted in the front wall of the housing 1. The lever 6 further comprises a springy arm 6d having a tip which can enter the oncoming perforations 3a of the film 3. The tip then serves to deform the arm 6d by pivoting it with reference to the remaining arms of the control lever 6. The arm 6d is provided with an extension or follower 6d having a tracking face 6e provided with an opening or notch 6f.

FIG. 1 illustrates the control lever 6 in a starting position which the lever assumes upon completion of an exposure. As shown, the tip of the arm 6d is remote from the nearest perforation 3a and bears against the front side of the film 3 and against a fixed stop 11 in the housing 1. The latter supports a second fixed stop 12 which constitutes a cam and serves to cooperate with the tracking face 6e of the follower 6D.

prior to making the next exposure, the operator of the camera must transport the film 3 by the length of a frame. This is achieved by rotating the wheel 5 and the shaft 4 in a counterclockwise direction, as viewed in FIG. 1, whereby the takeup reel collects the film and the next-following (oncoming) perforation 3a (not shown) travels toward the tip of the arm 6d. When the tip of the arm 6d enters the oncoming perforation 3a, it also penetrates into the opening 2a of the film guide 2 under the action of the springy arm 6a. The control lever 6 then dwells in an intermediate position. The film 3 continues to advance in a direction to the right, as viewed in FIG. 1, so that the springy arm 6d undergoes deformation by pivoting in a counterclockwise direction, as viewed in FIG. 1. The arrangement is such that, when the tip of the arm 6d is free to enter an oncoming perforation 3a and the opening 2a, the tracking face 6e of the follower 6D can engage the cam 12 which then holds the control lever 6 in the intermediate position in which the pallet 6b' of the arm 6b is adjacent to but still spaced from the teeth of the film transporting wheel 5, i.e., the operation is still free to rotate this wheel in a counterclockwise direction and to transport the film 3 forwardly. Such further rotation of the wheel 5 and the resulting transport of film 3 in a direction to the right (while the tip of the arm 6d extends into the perforation 3a and opening 2a) causes deformation of the springy arm 6d in a counterclockwise direction, as viewed in FIG. 1, so that the tracking face 6e slides along the cam 12 and the latter ultimately registers with the notch 6f. The springy arm 6a is then free to pivot the control lever 6 in a clockwise direction so that the notch 6f receives the cam 12 and the pallet 6b' of the arm 6b is free to engage the adjacent tooth of the wheel 5. The wheel 5 and shaft 4 are held against further rotation in a counterclockwise direction at the exact moment when the transport of film 3 by the length of a frame is completed. This is the operative position of the control lever 6. It will be seen that the springy arm 6a is capable of moving the control lever 6 from the illustrated starting position to the intermediate position as soon as the tip of the arm 6d registers with an oncoming perforation 3a of the film, and that the arm 6a is thereupon free to move the control lever all the way to the operative position in which the cam 12 is received in the notch 6f of the follower 6D when the arm 6d has undergone a certain deformation necessary to place the notch 6f into registry with the cam 12.

The camera is now ready to make the next exposure which is initiated in response to depression of the knob 9. This knob pivots the lever 10 in a clockwise direction so that the left-hand arm of the lever 10 engages the rigid arm 6c and pivots the control lever 6 in a counterclockwise direction whereby the notch 6f is moved away from the cam 12 and the tip of the arm 6d is withdrawn from the opening 2a as well as from the adjacent perforation 3a. The arm 6d is then free to dissipate energy and returns into abutment with the stop 11 to take the position shown in FIG. 1. The springy arm 6a is stressed during counterclockwise pivotal movement of the rigid arms 6b, 6c of the control lever 6. The extent of clockwise pivotal movement of the springy arm 6d into engagement with the stop 11 is selected in such a way that the tip of the arm 6d is then away from registry with the perforation 3a, i.e., the arm 6d cannot reenter that perforation 3a from which it was withdrawn in response to depression of the knob 9. The camera is ready to make the next exposure as soon as the operator again rotates the wheel 5 in a counterclockwise direction to transport the film 3 by the length of a frame.

Figure 2:
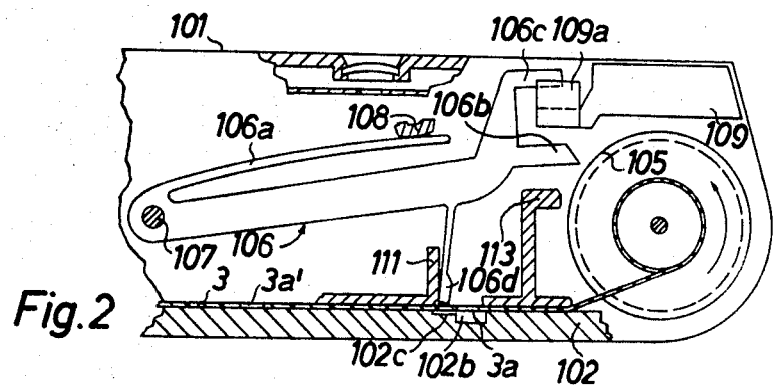
FIG. 2 is a fragmentary horizontal sectional view of a second still camera.

The camera of FIG. 2 comprises a release knob 109 which is installed in the top wall of the housing 101 and includes a cam 109a which can directly engage the rigid arm 106c of a control lever 106 turnable on a pivot pin 107. The film guide or platform 102 of the housing 101 comprises a composite cutout or opening including a shallower portion 102c and a deeper portion 102b. the arm 106d of the control lever 106 is elastic and normally bears against an L-shaped stop 111. The deeper portion 102b of the opening in the film guide 102 is analogous to the notch 6f in the arm 6d of FIG. 1. This opening can also be provided on the rear wall of the housing 101. A stop 113 is provided to guide the rigid arm 106b of the control lever 106 during movement toward engagement with the film transporting wheel 105. The springy arm 106a of the lever 106 bears against the retainer 108.

When the wheel 105 is rotated in a counter clockwise direction while the control lever 106 dwells in the starting position of FIG. 2, the film 3 moves in a direction to the right and the tip of the springy arm 106 d enters the oncoming perforation 3a' as well as the portion 102c of the opening in the film guide 102. The control lever 106 then assumes its intermediate position in which the wheel 105 is still free to transport the film 3 because the opening 102c is so shallow that the pallet of the arm 106b cannot engage the teeth of the wheel 105. The film 3 deforms the arm 106d so that the latter's tip travels in the opening 102c and ultimately enters the opening 102b whereby the arm 106b engages and holds the wheel 105 against further rotation in a counterclockwise direction. This is the operative position of the control lever 106. The camera is then ready for the next exposure which is made in response to depression of the release 109. The cam 109 a pivots the control lever 106 in a counterclockwise direction by way of the rigid arm 106c and against the opposition of the springy arm 106a. The arm 106d is withdrawn from the opening 102b and perforation 3a' and is free to return into abutment with the stop 111. The stop 113 constitutes an anvil against which the arm 106b abuts while holding the wheel 105 against rotation in a counterclockwise direction in the operative position of the control lever 106.

In the embodiment of FIG. 2, the tip of the springy arm 106d constitutes a follower and the adjacent portion of the platform 102 constitutes a cam along which the follower slides in the intermediate position of the control lever 106. The tip or follower of the arm 106d enters the opening 102b of this cam when the transport of the film 3 is completed whereby the arm 106a is free to move the control lever 106 to its operative position. Thus, the opening (6f or 102b) can be provided in the follower (extension 6D) or in the cam (platform 102).

Figure 3:
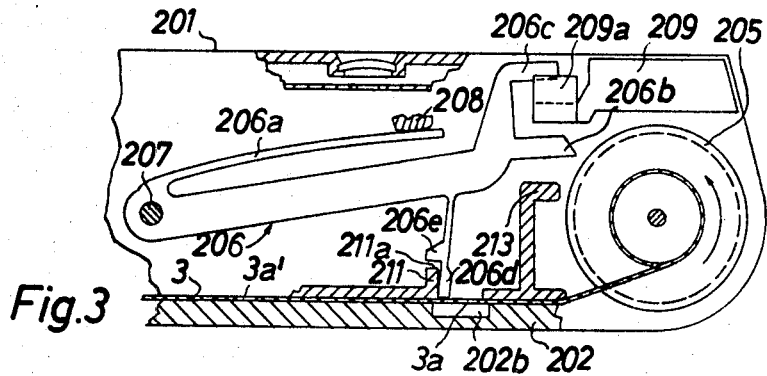
FIG. 3 is a fragmentary horizontal sectional view of a third camera.

In FIG. 3, all such parts which are clearly analogous to the parts of the camera shown in FIG. 2 are denoted by similar reference characters plus 100. The difference between the cameras of FIGS. 2 and 3 is that the member 211 serves as an abutment for the springy arm 206d as well as a stop for holding the control member 206 in its intermediate position. The front face 211a of the stop 211 is adjacent to but spaced from an extension 206e of the arm 206d in the starting position of the control lever 206. In the intermediate position of the lever 206, the tip of the arm 206d extends into the oncoming perforation 3a' and partly into the opening 202b of the film guided 202 because the extension 206e then bears against the front face 211a of the stop 211. The extension 206e moves beyond the front face 211a when the control lever 206 assumes its operative position so that the tip of the arm 206d can penetrate deeper into the opening 202b. The arm 206b then bears against the stop 213 and holds the wheel 205 against further rotation in a counterclockwise direction.

Exposure is made in response to depression of the release 209 which actuates the shutter and causes its cam 209a to effect return movement of the control lever 207 to the illustrated starting position.

In the embodiment of FIG. 3, a portion of the arm 206d constitutes a follower and the parts 202, 211 together constitute a cam which (namely, the face 211a) is tracked by the extension 206e of the follower in the intermediate position of the control lever 206. The cam is provided with the opening 202b into which the follower extends in the operative position of the lever 206.

It is clear that the improved camera is susceptible of many additional modifications without departing from the spirit of the present invention. For example, the control lever 6, 106 or 206 can be replaced with a reciprocable slide and this lever (or the slide) can further serve as a means for preventing actuation of the release 9, 109 or 209 when it dwells in the starting position.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What we claim as new and desire to be protected by Letters Patent is set forth in the appended claims.

1. In a photographic apparatus for use with roll film of the type having a row of perforations, one for each film frame, a combination comprising film transporting means operative to advance the film along a predetermined path; a housing supporting said film transporting means and defining said path; and a control member movable in said housing between starting and operative positions and through an intermediate position and tending to assume said operative position, said control member comprising a first portion arranged to prevent operation of said film transporting means in operative position of said control member and a springy second portion adjacent to said path and tending to enter an oncoming perforation during transport of the film to thereby permit movement of said control member from starting to intermediate position and to undergo deformation in response to further transport of film to permit movement of said control member to operative position upon completed transport of the film by the length of a frame.

2. A combination as defined in claim 1, wherein the first portion of said control member is rigid.

3. A combination as defined in claim 2, wherein said film transporting means comprises a rotary toothed member and said first portion comprises an arm which engages said toothed member in the operative position of said control member.

4. A combination as defined in claim 1, wherein said second portion includes a follower element and said housing comprises a cam element which is tracked by said follower element in the intermediate position of said control member.

5. A combination as defined in claim 4, wherein one of said elements is provided with a recess which accommodates the other element in the operative position of said control member.

6. A combination as defined in claim 1, further comprising release means actuatable to move said control member from operative to starting position and to thus permit renewed operation of said film transporting means.

7. A combination as defined in claim 6, wherein said control member comprises a rigid third portion and said release means comprises means for withdrawing said second portion from a perforation by way of said third portion so that the second portion can reassume its normal condition in which it engages stop means provided therefor in said housing.

8. A combination as defined in claim 1, wherein said control member comprises a springy portion and said housing comprises retainer means for stressing said springy portion so that the latter tends to maintain to maintain said control member in operative position.

9. A combination as defined in claim 1, wherein said second portion comprises a follower element and said housing comprises a cam element which is tracked by said follower element in the intermediate position of said control member, said follower element having a recess which receives said cam element in the operative position of said control member.

10. A combination as defined in claim 1, wherein said second portions comprises a follower element and said housing comprises a cam element which is tracked by said follower element in the intermediate position of said control member, said cam element having a recess which receives said follower element in the operative position of said control member.

11. A combination as defined in claim 10, wherein said housing comprises a film guide and wherein said cam element forms part of said film guide.

12. A combination as defined in claim 10, wherein said housing comprises a wall and said cam element forms part of said wall.